US 6,553,842 B1

(12) United States Patent
Tebeau

(10) Patent No.: US 6,553,842 B1
(45) Date of Patent: Apr. 29, 2003

(54) PRESSURIZATION TEST ADAPTER

(75) Inventor: David R. Tebeau, 5153 S. Coolidge St., Aurora, CO (US) 80016

(73) Assignee: David R. Tebeau, Aurora, CO (US)

( * ) Notice: Subject to any disclaimer, the term of this patent is extended or adjusted under 35 U.S.C. 154(b) by 0 days.

(21) Appl. No.: 10/195,768

(22) Filed: Jul. 11, 2002

(51) Int. Cl.[7] .............................................. G01L 7/00
(52) U.S. Cl. ........................................................ 73/756
(58) Field of Search ..................... 73/756, 195, 861.42, 73/861.45, 49.5, 49.6; 137/12, 15.08, 15.18, 82, 84, 216, 216.1, 216.2, 217, 227, 247.11, 247.13, 247.15, 247.17

(56) References Cited

U.S. PATENT DOCUMENTS 4,702,754 A  * 10/1987 Blocker ........................ 96/421
5,681,459 A  * 10/1997 Bowman ..................... 210/232

* cited by examiner

Primary Examiner—William Oen
(74) Attorney, Agent, or Firm—Russell S. Krajec; The Law Offices of William W. Cochran, LLC

(57) ABSTRACT

Disclosed is an apparatus and method of pressure testing an installed pipe by inserting a fitting into the internal threads found in saddle tee fittings. The internal threads of the fitting used by the cutting mechanism may allow a common apparatus to be used across different manufacturer's fittings without modification. Further, the device has a certain length of thread engagement to allow for proper engagement while maintaining the load carrying capacity required to properly perform the pressure test.

7 Claims, 5 Drawing Sheets

PRESSURIZATION TEST ADAPTER

BACKGROUND OF THE INVENTION a. Field of the Invention

The present invention pertains generally to pressure testing of pipe and specifically to the pressure testing of polyethylene gas lines.

b. Description of the Background

Polyethylene ('Poly') pipe has become popular for the construction of pipelines for various purposes. Poly pipe enjoys a low cost of installation and very efficient and quick joining technology in addition to being flexible and easy to install. Poly pipe is used for pressurized applications such as gas and water, and for unpressurized applications such as sewer.

In a natural gas distribution system for distributing gas to houses, a main line may be installed along a roadway initially and tees would be installed at a later date to complete the service from the main line to each house. The tee may be a saddle tap tee, such as shown in FIG. 1. The tee fitting 100 is sealed to the pipe 102 using multiple methods. After the tee 100 is sealed to the pipe 102, a cutting device located inside the tee 100 is engaged to penetrate the exterior surface of pipe 102 and allow communication of the fluid or gas inside the pipe 102 to flow through the tee 100. Such fittings are commonly used in the industry.

As stated above, a main line may be installed in the ground and feeder lines installed using tees to individual houses. A feeder line may be fully installed except for the penetration of the exterior of the main pipe when a pressurization test may be necessary to ensure proper installation.

In pressurized applications, especially with natural gas or propane, pressure testing of an installation or segment of an installation is mandatory before the segment can be put into service. Such a test requires that the segment of pipe be sealed off and pressurized with a gage applied. When the pressure source is removed, the segment of pipe must maintain pressure for a certain period of time to ensure that the pipeline has no leaks. After the test is successful, the exterior of the main line pipe may be penetrated through the tee fitting and the feeder line is thusly placed in service.

There are many different designs of tee fittings in commercial use. For example, the saddle tees may be fusion welded to the main line pipe or resistive heating may be employed between the fitting and the pipe to affect a weld. The sizes of main line pipe may range from two inch outer diameter to twelve, fourteen, or even larger sizes. The tee fittings are available in many different sizes, however, two sizes are most commonly used in feeder line applications. These sizes are one inch and two inch diameter.

Several different manufacturers supply these tee fittings. Each manufacturer may use a different sealing system and slightly different design. Some pressure test devices exist that attach to the tee fitting using the same threads and sealing system as the cap of the fitting. With the great number of different sealing systems, such as having an o-ring on the body of the fitting or located in the cap itself, and the use of specialized buttress threads in some fittings, a specialized pressure test adapter must be created for each manufacturer's fitting design.

Alternative methods for performing a pressurization test is to install a special tee fitting along the course of the feeder line. The special fitting is installed solely for the purpose of performing the pressurization test and is not subsequently used once the feeder line is put into service. The disadvantage is that the additional test fitting is another potential leak path as well as being another expense.

It would therefore be advantageous to provide a device and method of testing a feeder line that would be applicable to many manufacturer's tee fitting designs without having any changeover. It would be further advantageous if the apparatus and method did not require any additional fittings to be installed in the feeder line.

SUMMARY OF THE INVENTION

The present invention overcomes the disadvantages and limitations of the prior art by providing a device and method for sealing pressure test apparatus using the inside threaded portion of a tee fitting. Further, the device may be simply adapted from one size of tee fitting to a second size.

The present invention may therefore comprise a method for pressure testing a branch circuit of polyethylene pipe that is connected to a main line with a tapping tee fitting comprising: removing the cap of said tapping tee; adjusting the position of the hole cutter inside said tapping tee to a depth at least approximately equal to the diameter of said hole cutter; installing a pressure test adapter to said tapping tee, said adapter being adapted to engage the internal threads of said tapping tee, said internal threads being the threads in which said hole cutter is engaged, said adapter having an o-ring seal, said o-ring seal being adapted to seal against the surface of said tapping tee that is perpendicular to said internal threads, said adapter having a valve and a pressure gage; applying a pressure source to said valve to pressurize said tapping tee; indicating a pressure on said pressure gage; removing said pressure from said valve, said valve being engaged to hold said pressure inside of said tapping tee; and ensuring that said pressure is maintained within a predetermined limit for a predetermined time.

The present invention may further comprise a method for pressure testing at least two branch circuits of polyethylene pipe that is connected to a main line with at least two sizes of tapping tees comprising: removing the cap of a first tapping tee; adjusting the position of the hole cutter inside said first tapping tee to a depth at least approximately equal to the diameter of said hole cutter; installing a pressure test adapter to said first tapping tee, said adapter being adapted to engage the internal threads of said tapping tee, said internal threads being the threads in which said hole cutter is engaged, said adapter having an o-ring seal, said o-ring seal being adapted to seal against the surface of said first tapping tee that is perpendicular to said internal threads, said adapter having a valve and a pressure gage; applying a pressure source to said valve; indicating a pressure on said pressure gage; removing said pressure from said valve, said valve being engaged to hold said pressure inside of said first tapping tee; ensuring that said pressure is maintained within a predetermined limit for a predetermined time; selecting a second tapping tee for testing, said second tapping tee being a larger size than said first tapping tee; removing the cap of said second tapping tee; adjusting the position of the hole cutter inside said second tapping tee to a depth at least approximately equal to the diameter of said hole cutter; installing a size adapter into said second tapping tee, said size adapter having external threads adapted to engage the internal threads of said second tapping tee and internal threads adapted to engage the external threads of said pressure test adapter, said size adapter further having an o-ring seal adapted to seal against the surface of said second tapping tee that is perpendicular to said internal threads of said second tapping tee; installing said pressure test adapter to said size adapter such that said o-ring seal of said pressure test adapter engages said size adapter; applying a pressure source to said valve; indicating a pressure on said pressure gage; removing said pressure from said valve, said valve being engaged to hold said pressure inside of said second tapping tee; and ensuring that said pressure is maintained within a predetermined limit for a predetermined time.

The present invention may further comprise a pressurization test apparatus for performing a pressurization test on at least two tapping tees with internal threads of different sizes comprising: a pressurization test fitting having a valve adapted to receive pressurized air, a pressure gage adapted to indicate the pressure inside the pressurized circuit, and external threads adapted to fit inside the internal threads of a first tapping tee, said test fitting further comprising an o-ring seal adapted to seal against the surface perpendicular to said internal threads of said first tapping tee; and an size adapter having internal threads adapted to receive said external threads of said pressurization test fitting, a sealing surface perpendicular to said internal threads adapted to seal against said o-ring seal of said pressurization test fitting, external threads adapted to fit inside the internal threads of a second tapping tee, said second tapping tee being larger in size than said first tapping tee, said size adapter further having an o-ring seal adapted to seal against the surface perpendicular to said internal threads of said second tapping tee.

The advantages of the present invention are that several sizes of tapping tees may be pressure tested. Further, since the present invention will work with the tapping tees from many different manufacturers, custom test adapters for each manufacturer's fittings are no longer required.

DETAILED DESCRIPTION OF THE INVENTION

Figure 1:
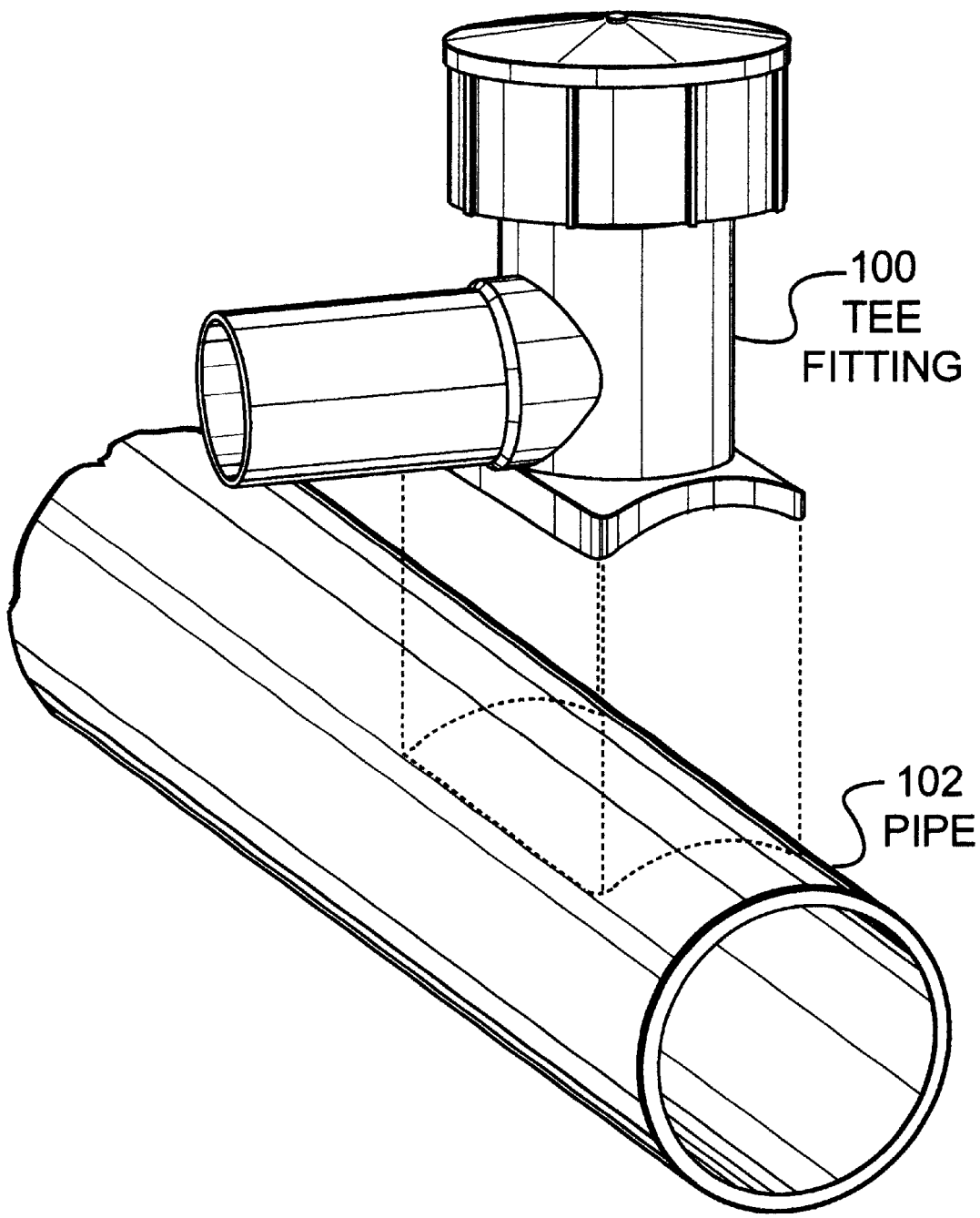
FIG. 1 is an illustration of tapping saddle tee.
Figure 2:
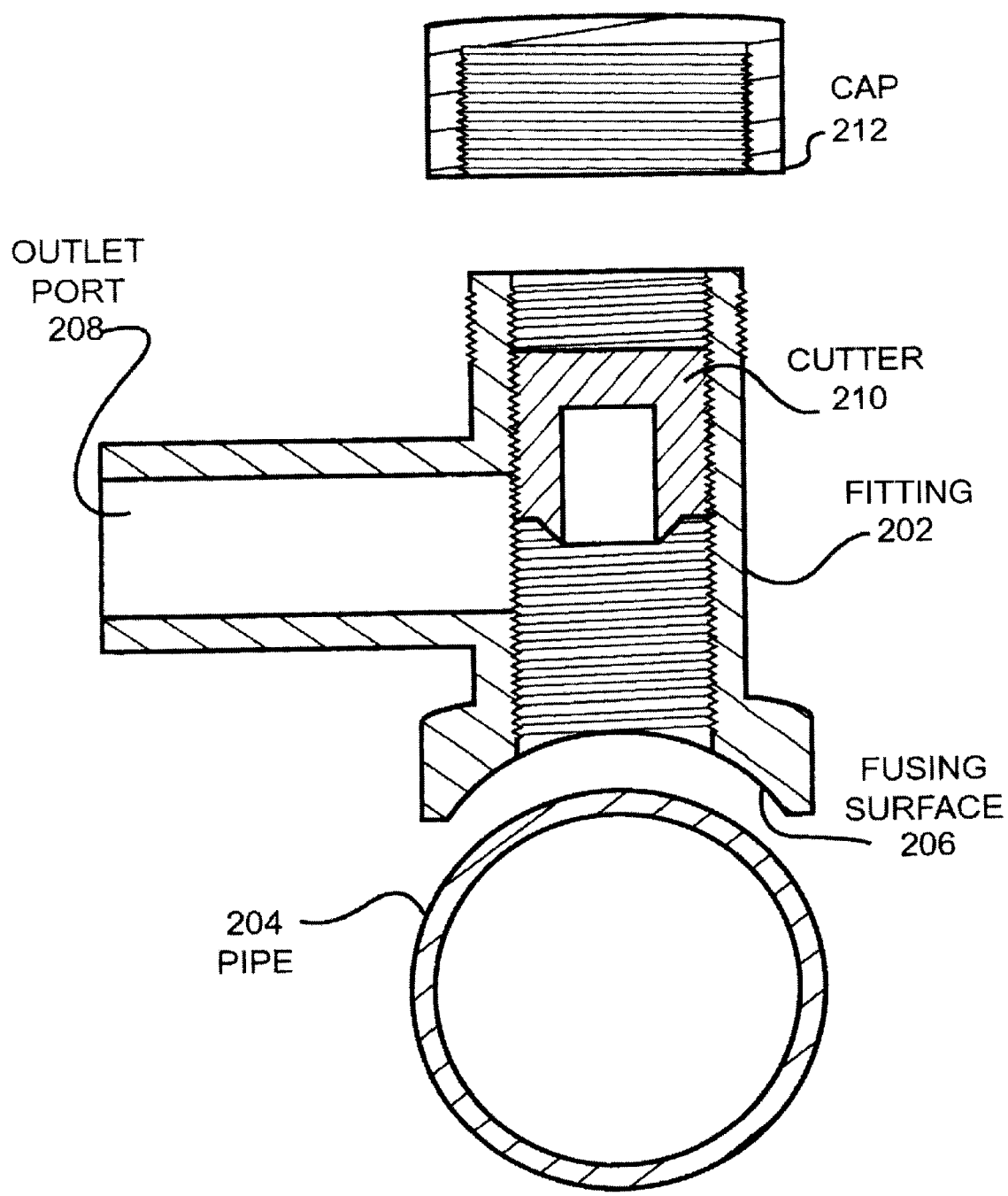
FIG. 2 is an illustration of a cross section of a standard tapping tee fitting.

FIG. 2 illustrates a cross section of a standard tee fitting. The fitting 202 mates to the pipe 204 along the sealing surface 206. The fitting has an outlet port 208, a cutter 210, and a cap 212.

The normal process for operation is to attach the fitting 202 to the pipe 204 by sealing along the surface 206. In some cases, a hot plate is placed along the sealing surface of the pipe 204 and the fitting 202 until the polyethylene material is to a melted state. At that point, the fitting 202 is forced against the pipe 204 and the melted material is allowed to cool. In other cases, a resistive material is embedded in the fitting 202. The fitting 202 is pressed against the pipe 204 and an electrical current is applied to the resistive material, causing the polyethylene to melt and the fitting to fuse to the pipe.

Once the fitting is sealed to the pipe, another pipe may be attached to the outlet port 208 to complete the installation. When the installation is completed, a pressurization test may be performed.

After the pressurization test, the cap 212 may be removed and the cutter 210 may be engaged so that it penetrates the exterior surface of the pipe 204. The cutter 210 typically has a receptacle for a wrench for a pipefitter to engage the cutter. The cutter 210 travels down the internally threaded portion of the fitting 202 until it engages the pipe 204, penetrates the surface, and produces a hole. At that point, the cutter 210 may be retracted to the top of the fitting 202 so that the full volume of gas or fluid may transfer between the main line pipe 204 and the fitting outlet 208.

The pressurization test may be performed by installing a special tee fitting into the feeder line. The special tee fitting may be used only for the pressurization test wherein the pipefitter may apply the pressure testing apparatus.

Figure 3:
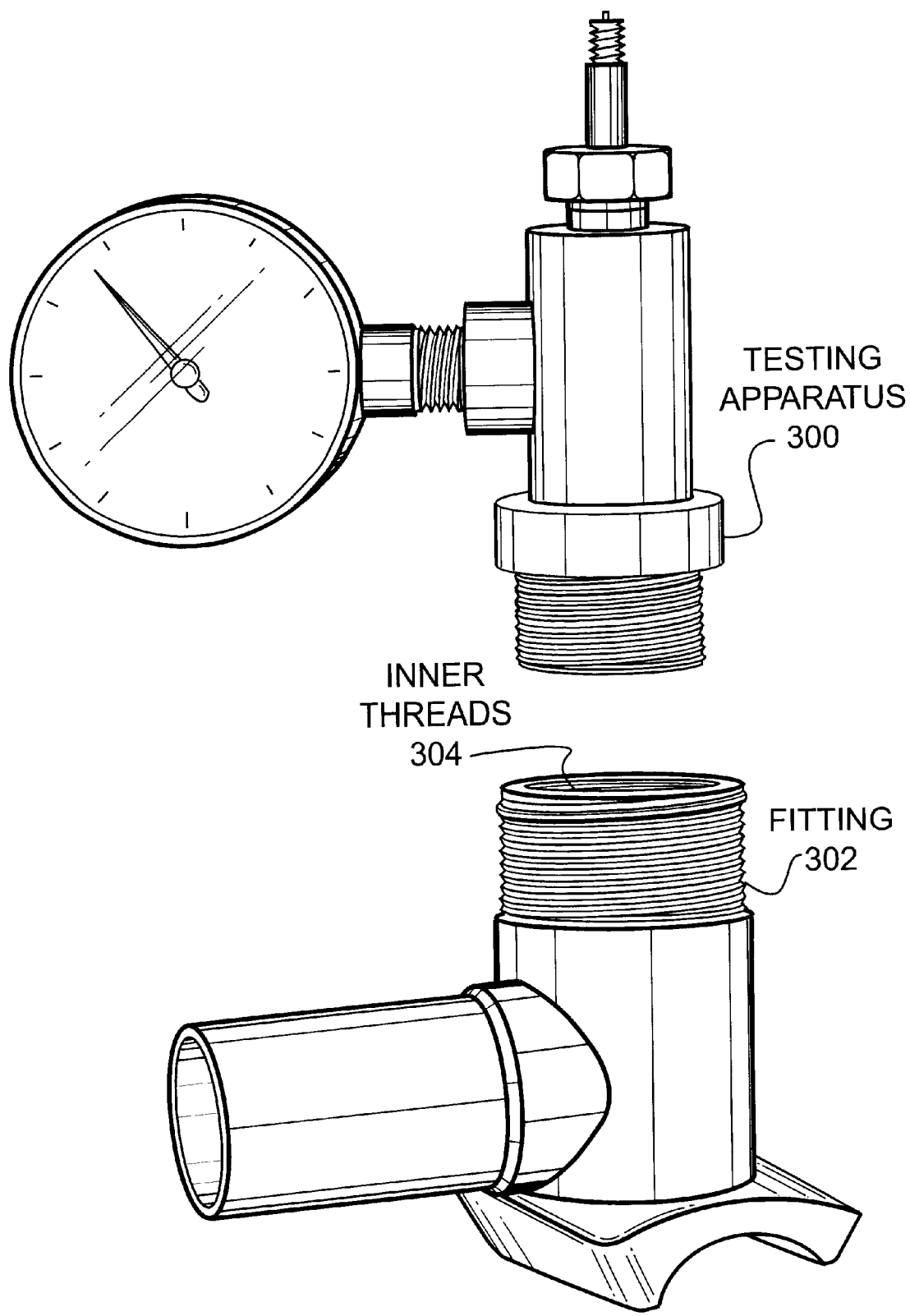
FIG. 3 is an illustration of an embodiment of the present invention with the inventive pressure testing apparatus prior to being installed into a tapping tee fitting.

FIG. 3 illustrates an embodiment 300 of the present invention with the apparatus 300 prior to being installed into a tee fitting 302. The apparatus 300 is installed into the inner threads 304 of the fitting 302. The threads 304 are the threads that propel the internal cutter into the pipe during installation as discussed for FIG. 2.

Figure 4:
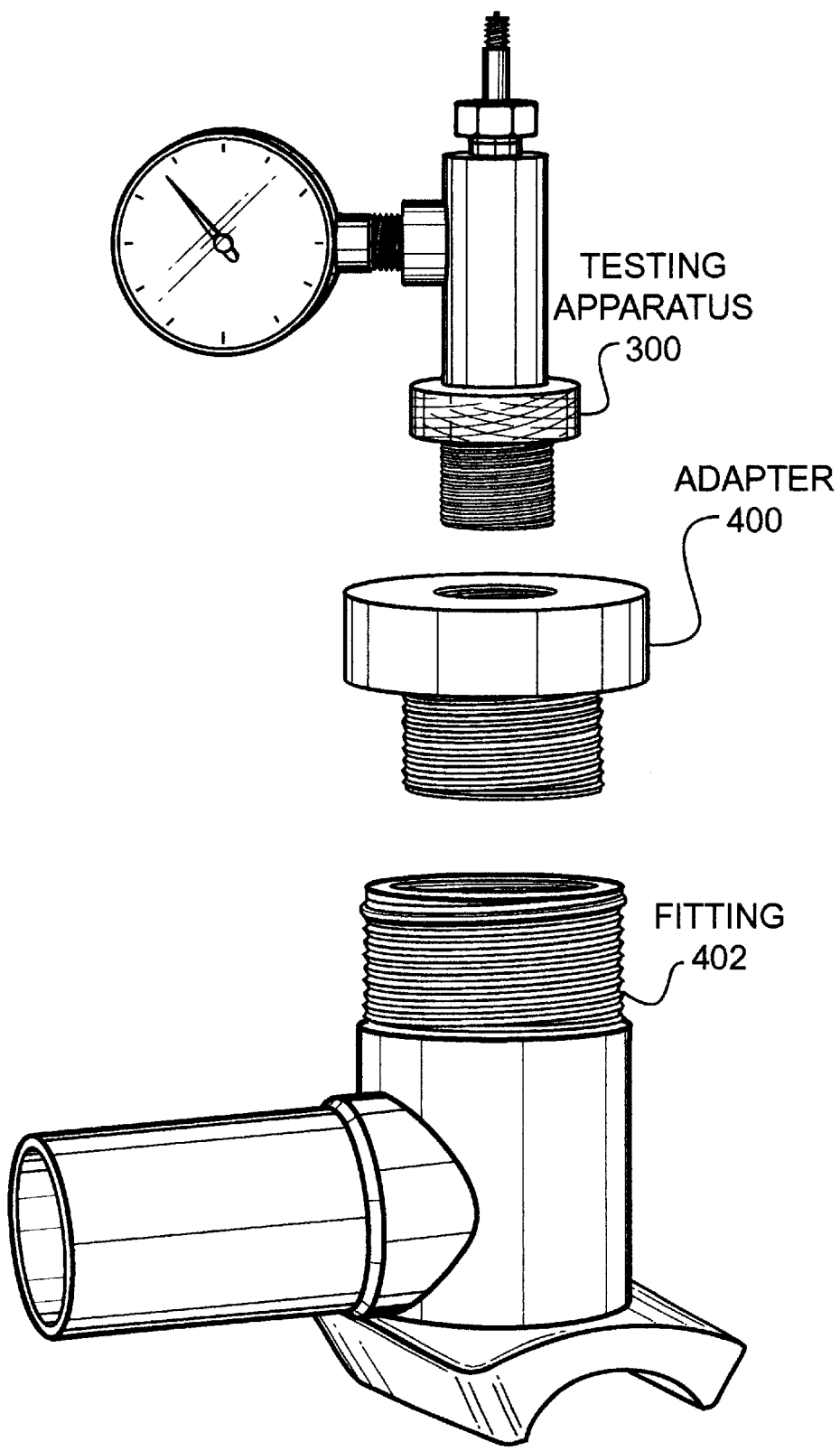
FIG. 4 is an illustration of an embodiment of the present invention wherein the inventive pressure testing apparatus has an additional fitting that allows the system to be utilized with a larger sized tapping tee fitting.

FIG. 4 illustrates an embodiment 300 of the present invention wherein the apparatus 300 has an additional fitting 400 that allows the system to be utilized with a larger sized fitting 402. The fitting 400 is specially made to emulate the internal threads of the smaller sized fitting such that the embodiment 300 is adaptable to two commonly used fittings.

The apparatus 300 and the fitting 400 comprise a device and method for pressure testing a pipe prior to engagement of the cutter that penetrates the exterior of a main line, allowing a pipefitter to install and test a feeder line without the use of additional special fittings for pressure testing. Further, the internal threads tend to be common between various fitting manufacturers, allowing the apparatus 300 and fitting 400 to be used across multiple manufacturers without any changeover or different fittings to be used.

In prior art, the pressurization test adapters have been manufactured that fit over the exterior threads used by the cap on the tee fitting. Such adapters have the distinct disadvantage that the fittings are changed periodically by the manufacturers, causing the pressure test adapters to become obsolete. Further, there was no convenient way to create a pressure test adapter system that operated on more than one size of fitting.

Figure 5:
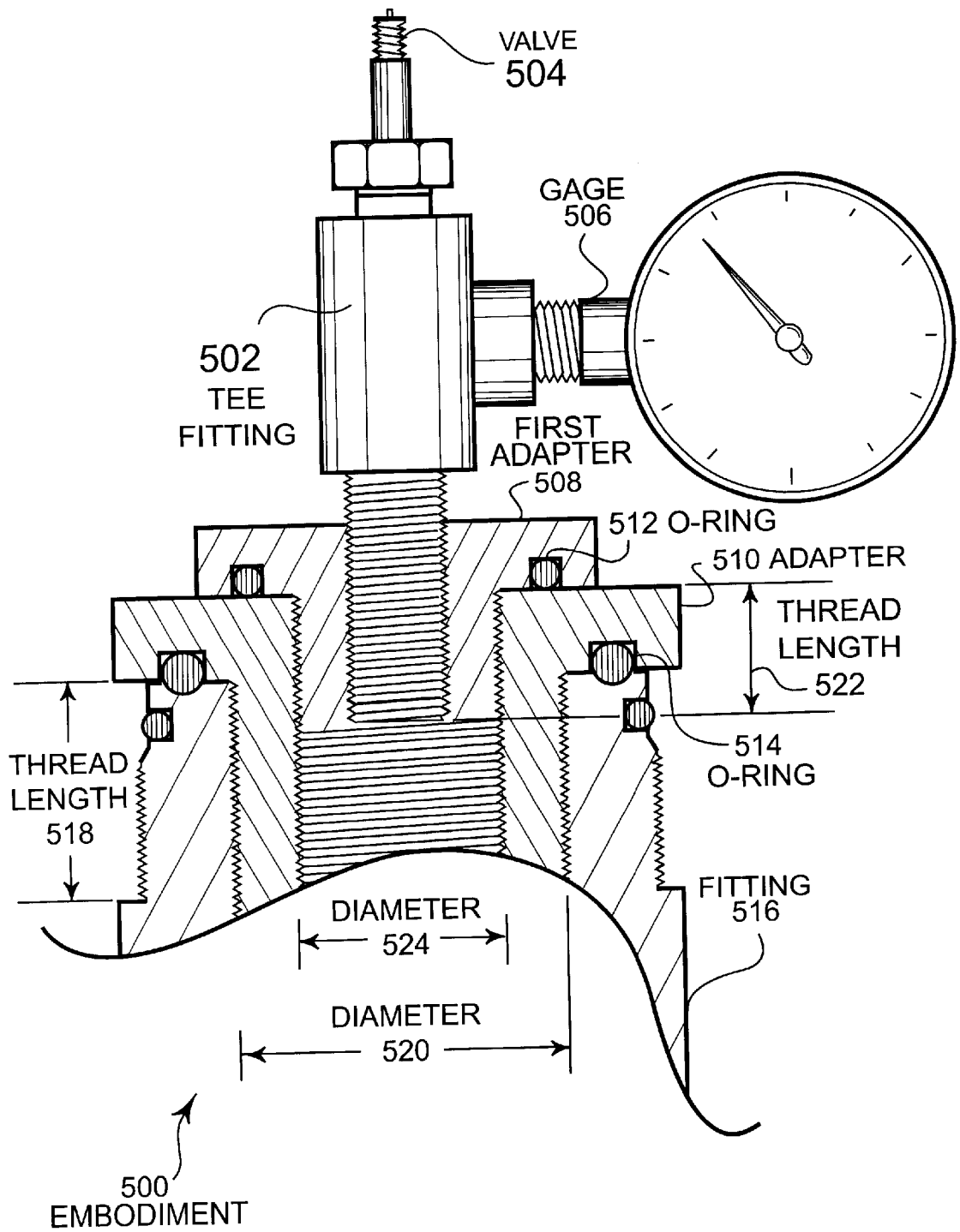
FIG. 5 is an illustration of a partial cross section of an embodiment of the present invention.

FIG. 5 illustrates a partial cross section of an embodiment 500 of the present invention. A tee fitting 502 connects a valve 504, a pressure gage 506, and the first adapter 508. The first adapter 508 fits into the second adapter 510 to test larger sized fittings. The first adapter 508 has an o-ring 512 that seals the first adapter 508 to the second adapter 510 or to a small sized fitting when the second adapter 510 is not present. The second adapter 510 has an o-ring 514 that seals against a fitting 516 when the embodiment 500 is in service.

The o-rings 512 and 514 are an effective method of sealing the embodiment 500 to the fitting during use. The o-ring 514 seals against the top surface of the fitting 516. When the embodiment 500 is used on a smaller sized fitting, second adapter 510 would not be used and o-ring 512 would seal against the top surface of the smaller fitting.

The fittings 508 and 510 may be installed by hand or with a wrench. In some embodiments, the fittings 508 and 510 may be fabricated of metal, such as aluminum, steel, or brass. When the threads of the metal fittings 508 and 510 are inserted into the polyethylene tee fittings, only a limited amount of force is necessary to affect a seal on the o-ring. Excessive tightening may result in stripped threads on the tee fitting. In order to prevent stripped threads, a long length of threads is provided in the fittings 508 and 510. In the present embodiment, the thread length 518 is approximately equal to at least 75% of the diameter 520. In a similar fashion for the first adapter 508, the thread length 522 is approximately equal to at least 75% of the diameter 524.

The long thread length compensates in part for the relative weakness of the plastic threads of the fitting. When the embodiment 500 is in service, the pressure applied to the inside of the fitting may be in excess of 100 psi or higher, causing a large load on the threads. In addition, the long lead length assists the pipefitter during installation since a cross-threaded joint will be quickly determined and backed out before the fitting was completely installed. If a thread were cross-threaded, it could be repaired and the adapter may still be used, since good threads may still exist for the adapter to engage.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for pressure testing a branch circuit of polyethylene pipe that is connected to a main line with a tapping tee fitting comprising:

removing the cap of said tapping tee;

adjusting the position of the hole cutter inside said tapping tee to a depth at least approximately equal to the diameter of said hole cutter;

installing a pressure test adapter to said tapping tee, said adapter being adapted to engage the internal threads of said tapping tee, said internal threads being the threads in which said hole cutter is engaged, said adapter having an o-ring seal, said o-ring seal being adapted to seal against the surface of said tapping tee that is perpendicular to said internal threads, said adapter having a valve and a pressure gage;

applying a pressure source to said valve to pressurize said tapping tee;

indicating a pressure on said pressure gage;

removing said pressure from said valve, said valve being engaged to hold said pressure inside of said tapping tee; and ensuring that said pressure is maintained within a predetermined limit for a predetermined time.

2. The method of claim 1 wherein said step of installing a pressure test adapter is done by turning said pressure test adapter hand tight.

3. A method for pressure testing at least two branch circuits of polyethylene pipe that is connected to a main line with at least two sizes of tapping tees comprising:

removing the cap of a first tapping tee;

adjusting the position of the hole cutter inside said first tapping tee to a depth at least approximately equal to the diameter of said hole cutter;

installing a pressure test adapter to said first tapping tee, said adapter being adapted to engage the internal threads of said tapping tee, said internal threads being the threads in which said hole cutter is engaged, said adapter having an o-ring seal, said o-ring seal being adapted to seal against the surface of said first tapping tee that is perpendicular to said internal threads, said adapter having a valve and a pressure gage;

applying a pressure source to said valve;

indicating a pressure on said pressure gage;

removing said pressure from said valve, said valve being engaged to hold said pressure inside of said first tapping tee;

ensuring that said pressure is maintained within a predetermined limit for a predetermined time;

selecting a second tapping tee for testing, said second tapping tee being a larger size than said first tapping tee;

removing the cap of said second tapping tee;

adjusting the position of the hole cutter inside said second tapping tee to a depth at least approximately equal to the diameter of said hole cutter;

installing a size adapter into said second tapping tee, said size adapter having external threads adapted to engage the internal threads of said second tapping tee and internal threads adapted to engage the external threads of said pressure test adapter, said size adapter further having an o-ring seal adapted to seal against the surface of said second tapping tee that is perpendicular to said internal threads of said second tapping tee;

installing said pressure test adapter to said size adapter such that said o-ring seal of said pressure test adapter engages said size adapter;

applying a pressure source to said valve;

indicating a pressure on said pressure gage;

removing said pressure from said valve, said valve being engaged to hold said pressure inside of said second tapping tee; and ensuring that said pressure is maintained within a predetermined limit for a predetermined time.

4. The method of claim 3 wherein said step of installing a pressure test adapter is done by turning said pressure test adapter hand tight.

5. A pressurization test apparatus for performing a pressurization test on at least two tapping tees with internal threads of different sizes comprising:

a pressurization test fitting having a valve adapted to receive pressurized air, a pressure gage adapted to indicate the pressure inside the pressurized circuit, and external threads adapted to fit inside the internal threads of a first tapping tee, said test fitting further comprising an o-ring seal adapted to seal against the surface perpendicular to said internal threads of said first tapping tee; and an size adapter having internal threads adapted to receive said external threads of said pressurization test fitting, a sealing surface perpendicular to said internal threads adapted to seal against said o-ring seal of said pressurization test fitting, external threads adapted to fit inside the internal threads of a second tapping tee, said second tapping tee being larger in size than said first tapping tee, said size adapter further having an o-ring seal adapted to seal against the surface perpendicular to said internal threads of said second tapping tee.

6. The apparatus of claim 5 wherein said size adapter further comprises a knurled surface about the circumference of said size adapter.

7. The apparatus of claim 5 wherein said pressurization test fitting further comprises a knurled surface about the circumference of said pressurization test fitting.

* * * * *